(12) United States Patent
Huang et al.

(10) Patent No.: US 10,843,435 B2
(45) Date of Patent: Nov. 24, 2020

(54) BREATHABLE AND WATERPROOF COMPOSITE CLOTH

(71) Applicants: Chen-Cheng Huang, Taipei (TW); Pao-Hao Huang, Taipei (TW); Pao-Han Huang, Taipei (TW)

(72) Inventors: Chen-Cheng Huang, Taipei (TW); Pao-Hao Huang, Taipei (TW); Pao-Han Huang, Taipei (TW)

( * ) Notice: Subject to any disclaimer, the term of this patent is extended or adjusted under 35 U.S.C. 154(b) by 242 days.

(21) Appl. No.: 15/997,262

(22) Filed: Jun. 4, 2018

(65) Prior Publication Data

US 2018/0354223 A1 Dec. 13, 2018

(30) Foreign Application Priority Data

Jun. 7, 2017 (TW) ............................. 106118807 A

(51) Int. Cl.

| B32B 3/24 | (2006.01) |
|---|---|
| B32B 3/26 | (2006.01) |
| B32B 27/32 | (2006.01) |
| B32B 27/36 | (2006.01) |
| B32B 3/30 | (2006.01) |
| B32B 27/12 | (2006.01) |

(52) U.S. Cl.
CPC ............... *B32B 3/266* (2013.01); *B32B 3/30* (2013.01); *B32B 27/12* (2013.01); *B32B 27/32* (2013.01); *B32B 27/36* (2013.01); *B32B 2307/724* (2013.01); *B32B 2307/7265* (2013.01)

(58) Field of Classification Search
CPC ..... Y10T 428/24281; Y10T 428/24289; B32B 3/266
USPC ......................................................... 428/132
See application file for complete search history.

(56) References Cited

U.S. PATENT DOCUMENTS

| 6,461,716 B1 * | 10/2002 | Lee .......................... A61L 15/26 428/137 |
| 2014/0363625 A1 * | 12/2014 | Huang .................... B32B 27/12 428/133 |

* cited by examiner

*Primary Examiner* — William P Watkins, III
(74) *Attorney, Agent, or Firm* — Hamre, Schumann, Mueller & Larson, P.C.

(57) ABSTRACT

A breathable and waterproof composite cloth includes a fabric and a waterproof plastic film bonded to the fabric. The fabric has opposite first and second surfaces, and a plurality of micropores and raised portions. The waterproof plastic film has opposite inner and outer surfaces, and a plurality of spaced-apart first and second hollow protrusions. Each of the first hollow protrusions extends through a corresponding one of the micropores. A portion of the second hollow protrusions are respectively interposed between two adjacent ones of the raised portions. The first and second hollow protrusions respectively define first and second ventilating passages extending through the inner and outer surfaces.

12 Claims, 3 Drawing Sheets

BREATHABLE AND WATERPROOF COMPOSITE CLOTH

CROSS-REFERENCE TO RELATED APPLICATION

This application claims priority of Taiwanese Invention Patent Application No. 106118807, filed on Jun. 7, 2017.

FIELD

This invention relates to a breathable and waterproof composite cloth, more particularly to a breathable and waterproof composite cloth including a fabric that has micropores and raised portions and a waterproof plastic film that has hollow protrusions.

BACKGROUND

A conventional Gore-text, breathable and waterproof fabric for outdoor clothing includes an outer shell, an inner liner, and a triply structure interposed between the outer shell and the inner liner. The triply structure includes a breathable and waterproof sponge-like porous membrane sandwiched between two protection layers. The porous membrane is made from a polymer, such as polytetrafluoroethylene (PTFE, e.g., Teflon®, a trademark and a brand name of Chemours), polyvinylidene fluoride (PVDF), and polyurethane, and is formed with pores in a known manner, such as that disclosed in U.S. Pat. Nos. 3,953,566 and 4,187,390. The pores formed in the porous membrane have a pore diameter in the order of less than 1 micron in order to permit transpiration of water vapor therethrough and prevent water from passing therethrough. The porous membrane has a thickness ranging from 50 microns to several hundreds of microns.

Another method of making a breathable and waterproof fabric (CORE CONSTRUCTION™) is proposed by an apparel company, Voormi®. The method is carried out by weaving a breathable and waterproof membrane and a fabric together so as to form the breathable and waterproof fabric having a non-layered structure.

The breathable and waterproof fabrics made by the above-mentioned conventional methods have irregularly shaped and randomly distributed pores, and thus, breathability thereof still needs to be improved. Moreover, a relatively high production cost is incurred because of processing complexity.

SUMMARY

Therefore, an object of the disclosure is to provide a breathable and waterproof composite cloth that can alleviate at least one of the drawbacks of the prior art.

According to the disclosure, the breathable and waterproof composite cloth includes a fabric and a waterproof plastic film.

The fabric has a first surface, a second surface opposite to the first surface, plurality of micropores extending through the first and second surfaces, and a plurality of raised portions protruding from the first surface. A distance between two adjacent ones of the raised portions is smaller than a distance between two adjacent ones of the micropores.

The waterproof plastic film has an inner surface bonded to the first surface of the fabric, an outer surface opposite to the inner surface, a plurality of first hollow protrusions protruding from the inner surface, and a plurality of second hollow protrusions protruding from the inner surface and spaced apart from the first hollow protrusions. Each of the first hollow protrusions extends through a corresponding one of the micropores of the fabric. At least one of the second hollow protrusions is interposed between two adjacent ones of the raised portions that are disposed between two adjacent ones of the first hollow protrusions.

Each of the first hollow protrusions forms a first ventilating passage. Each of the second hollow protrusions defines a second ventilating passage. Each of the first and second ventilating passages extends through the inner and outer surfaces.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
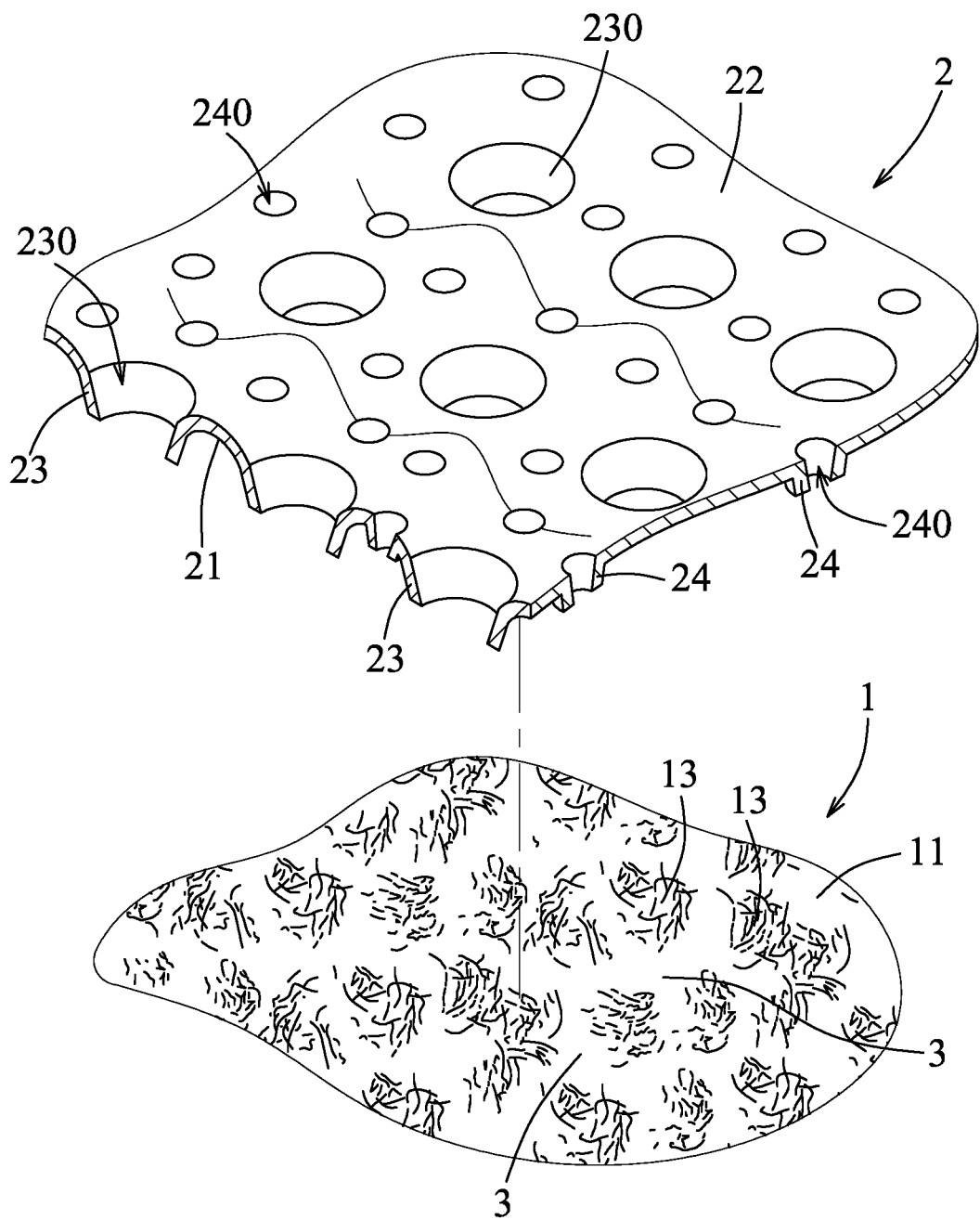
FIG. 1 is a fragmentary exploded perspective view of an embodiment of a breathable and waterproof composite cloth according to the disclosure.
Figure 2:
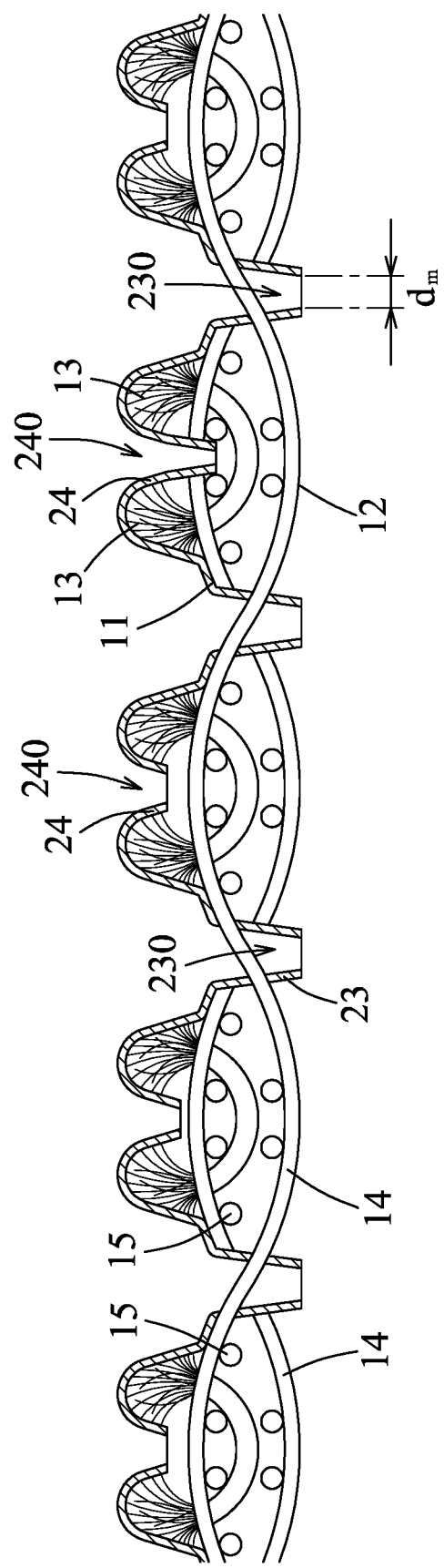
FIG. 2 is a fragmentary cross-sectional view of the embodiment.

Referring to FIGS. 1 and 2, an embodiment of a breathable and waterproof composite cloth according to the disclosure includes a fabric 1 and a waterproof plastic film 2.

The fabric 1 has a first surface 11, a second surface 12 opposite to the first surface 11, a plurality of micropores 3 extending through the first and second surfaces 11, 12, and a plurality of raised portions 13 protruding from the first surface 11. In the embodiment, the raised portions 13 of the fabric are piles of the fabric. A distance between two adjacent ones of the raised portions 13 is smaller than a distance between two adjacent ones of the micropores 3.

More specifically, the fabric 1 includes a plurality of warp yarns 14 and a plurality of weft yarns 15 interlaced with the warp yarns 14 so as to define the micropores 3 thereamong.

The fabric 1 may be made of one of flannel fabric, terry cloth, spacer fabric and mesh fabric. In this embodiment, the fabric 1 is made from the flannel fabric and has a plurality of piles that define the raised portions 13.

The waterproof plastic film 2 has an inner surface 21 bonded to the first surface 11 of the fabric 1, an outer surface 22 opposite to the inner surface 21, a plurality of first hollow protrusions 23 protruding from the inner surface 21, and a plurality of second hollow protrusions 24 protruding from the inner surface 21 and spaced apart from the first hollow protrusions 23. Each of the first hollow protrusions 23 extends through a corresponding one of the micropores 3 of the fabric 1. At least one of the second hollow protrusions 24 is interposed between two adjacent ones of the raised portions 13 that are disposed between two adjacent ones of the first hollow protrusions 23. In this embodiment, there are a plurality of the second hollow protrusions 24, each of which is disposed between two corresponding adjacent ones of the raised portions 13 that are disposed between two corresponding adjacent ones of the first hollow protrusions 23.

The waterproof plastic film 2 may be made from a thermoplastic material selected from polyolefin, polyester, thermoplastic elastomer and combinations thereof. In the embodiment, the inner surface 21 of the waterproof plastic film 2 is melt-bonded to the first surface 11 of the fabric 1, such that the waterproof plastic film 2 forms an embossed texture conforming with the contour of the first surface 11 of the fabric 1.

Each of the first hollow protrusions 23 forms a first ventilating passage 230, and each of the second hollow protrusions 24 defines a second ventilating passage 240. Each of the first ventilating passages 230 extends through the inner and outer surfaces 21, 22 and each of the second ventilating passages 240 extend through the inner and outer surfaces 21, 22 of the waterproof plastic film 2. More specifically, the first ventilating passage 230 of each of the first hollow protrusions 23 has a funnel-shape that tapers in a direction away from the raised portions 13 of the fabric 1. The second ventilating passage 240 of each of the second hollow protrusions 24 has a funnel-shape that tapers in the direction away from the raised portions of the fabric 1. Hence, the first ventilating passages 230 and the second ventilating passages 240 allow water vapor to pass therethrough and prevent water from passing therethrough. Furthermore, with the inclusion of the second ventilating passages 240, gaps between the raised portions 13 of the fabric 1 are enlarged to improve the breathability of the breathable and waterproof composite cloth without sacrificing the waterproof property thereof.

In the embodiment, the first ventilating passage 230 of each of the first hollow protrusions 23 of the waterproof plastic film 2 has a minimum diameter ($d_m$) ranging from 0.2 μm to 10 μm. More specifically, the $d_m$ of the first ventilating passage 230 of each of the first hollow protrusions 23 ranges from 0.5 μm to 10 μm. The second first ventilating passage 240 of each of the second hollow protrusions 24 of the waterproof plastic film 2 has a minimum diameter not greater than 0.2 μm. The micropores 3 of the fabric 1 have a pore size ranging from 20 μm to 200 μm.

Figure 3:
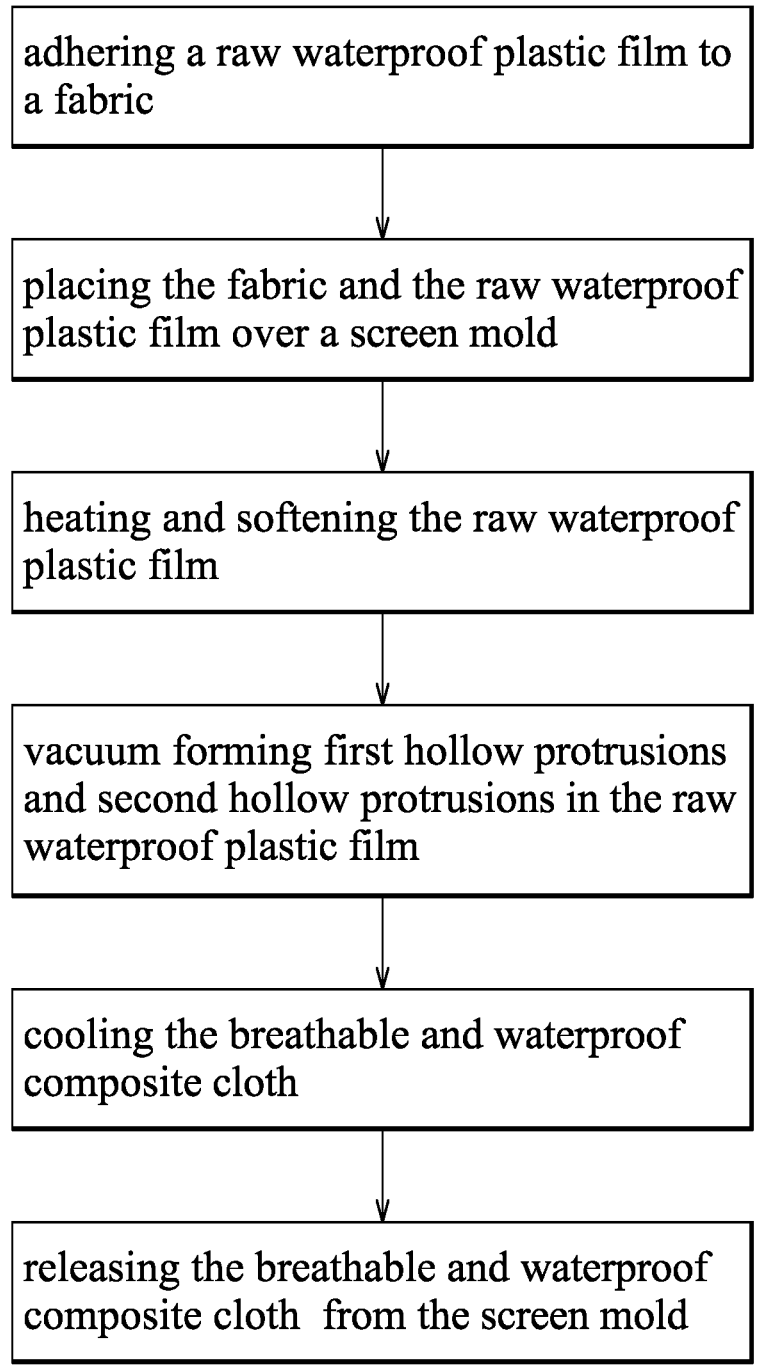
FIG. 3 is a process flowchart of a method of making the embodiment of the breathable and waterproof composite cloth according to the disclosure.

Referring to FIG. 3, a method of making the embodiment of the breathable and waterproof composite cloth is illustrated. The method includes: adhering a raw waterproof plastic film to the fabric 1; placing the fabric 1 and the raw waterproof plastic film over a screen mold; heating and softening the raw waterproof plastic film; vacuum forming the first hollow protrusions 23 and the second hollow protrusions 24 in the raw waterproof plastic film by applying a suction force to form the waterproof plastic film 2 and melt-bonding the waterproof plastic film 2 to the fabric 1 so as to form the breathable and waterproof composite cloth; cooling the breathable and waterproof composite cloth; and releasing the breathable and waterproof composite cloth from the screen mold.

By way of the abovementioned method of making the breathable and waterproof composite cloth, the minimum diameter ($d_m$) of the first ventilating passages 230 is adjustable based on a thickness of the waterproof plastic film 2 and the pore size of the micropores 3. Besides, depths of the first hollow protrusions 23 are also adjustable based on the pore size of the micropores 3. In addition, density of the first hollow protrusions 23 is adjustable by changing a mesh screen size of the screen mold, and density of the second hollow protrusions 24 is adjustable by changing a number of the raised portions 13 of the fabric 1. In general, the higher the density of the first hollow protrusions 23 and/or the second hollow protrusion 24 is, the higher the breathability of the waterproof plastic film 2 has. In one form, a portion of the first hollow protrusions 23 and/or a portion of the second hollow protrusions 24 may be replaced with blind holes that have one end opened at the outer surface 22 and another end closed at the inner surface 21, so as to adjust the waterproof property of the breathable and waterproof composite cloth.

To sum up, by means of the waterproof plastic film 2 having the first and second hollow protrusions 23, 24, the first and second ventilating passages 230, 240 thus formed can improve the breathability of the breathable and waterproof composite cloth without sacrificing the waterproof property thereof.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A breathable and waterproof composite cloth, comprising:
   a fabric having:
      a first surface,
      a second surface opposite to said first surface,
      a plurality of micropores extending through said first and second surfaces, and
      a plurality of raised portions protruding from said first surface, a distance between two adjacent ones of said raised portions being smaller than a distance between two adjacent ones of said micropores; and
   a waterproof plastic film having:
      an inner surface bonded to said first surface of said fabric,
      an outer surface opposite to said inner surface,
      a plurality of first hollow protrusions protruding from said inner surface, each of said first hollow protrusions extending through a corresponding one of said micropores of said fabric, and
      a plurality of second hollow protrusions protruding from said inner surface and spaced apart from said first hollow protrusions, at least one of said second hollow protrusions being interposed between two adjacent ones of said raised portions that are disposed between two adjacent ones of said first hollow protrusions,
   wherein each of said first hollow protrusions forms a first ventilating passage, each of said second hollow protrusions defining a second ventilating passage, each of said first and second ventilating passages extending through said inner and outer surfaces.

2. The breathable and waterproof composite cloth of claim 1, wherein said raised portions of said fabric are formed of piles.

3. The breathable and waterproof composite cloth of claim 1, wherein said first ventilating passage has a funnel-shape that tapers in a direction away from said raised portions of said fabric.

4. The breathable and waterproof composite cloth of claim 1, wherein said second ventilating passage has a funnel-shape that tapers in a direction away from said raised portions of said fabric.

5. The breathable and waterproof composite cloth of claim 1, wherein said first ventilating passage has a minimum diameter ranging from 0.2 µm to 10 µm.

6. The breathable and waterproof composite cloth of claim 5, wherein the minimum diameter of said first ventilating passage ranges from 0.5 µm to 5 µm.

7. The breathable and waterproof composite cloth of claim 1, wherein said second ventilating passage has a minimum diameter not greater than 0.2 µm.

8. The breathable and waterproof composite cloth of claim 1, wherein said micropores have a pore size ranging from 20 µm to 200 µm.

9. The breathable and waterproof composite cloth of claim 1, wherein said inner surface of said waterproof plastic film is melt-bonded to said first surface of said fabric.

10. The breathable and waterproof composite cloth of claim 1, wherein said waterproof plastic film is made from a thermoplastic material selected from polyolefin, polyester, thermoplastic elastomer and combinations thereof.

11. The breathable and waterproof composite cloth of claim 1, wherein said fabric includes a plurality of warp yarns and a plurality of weft yarns interlaced with said warp yarns so as to define said micropores thereamong.

12. The breathable and waterproof composite cloth of claim 1, wherein said fabric is made of one of flannel fabric, terry cloth, spacer fabric and mesh fabric.

* * * * *